United States Patent
Ye et al.

(10) Patent No.: US 12,547,470 B2
(45) Date of Patent: Feb. 10, 2026

(54) DOCKER-BASED PLUGINS FOR HYPERCONVERGED INFRASTRUCTURE PLATFORMS

(71) Applicant: Dell Products L.P., Round Rock, TX (US)

(72) Inventors: Jason Ye, Shanghai (CN); Tianming Zhang, Brighton, MA (US); Carl Shi, Shanghai (CN); Jia Wang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 545 days.

(21) Appl. No.: 17/975,302

(22) Filed: Oct. 27, 2022

(65) Prior Publication Data

US 2024/0143412 A1    May 2, 2024

(51) Int. Cl.
    *G06F 9/50*     (2006.01)
    *G06F 8/61*     (2018.01)
    *G06F 21/64*    (2013.01)

(52) U.S. Cl.
    CPC .............. *G06F 9/5072* (2013.01); *G06F 8/63* (2013.01); *G06F 21/645* (2013.01)

(58) Field of Classification Search
    CPC .................................................. G06F 9/5061
    See application file for complete search history.

(56) References Cited

U.S. PATENT DOCUMENTS

2024/0134526 A1*    4/2024    Watson .................. G06F 3/061

OTHER PUBLICATIONS

CN 105740048 (Year: 2016).*
KR 102380434 (Year: 2022).*
WO 2019133326 (Year: 2019).*

* cited by examiner

*Primary Examiner* — Charlie Sun
(74) *Attorney, Agent, or Firm* — Jackson Walker L.L.P.

(57) ABSTRACT

Disclosed systems and methods may retrieve a base image of a plugin for a hyperconverged infrastructure (HCI) platform and create a Docker image for an HCI platform plugin based, in part, on the base image. The HCI platform plugin enables an extended function not native to the HCI platform. Disclosed methods may include registering the Docker image within an HCI platform instance running on an HCI appliance associated with a customer, and saving the Docker image to a Docker image repository within the HCI platform instance. The extended HCI platform function may be any suitable function including, as an illustrative example, a function for provisioning a third party storage device within the HCI platform. Disclosed method steps may be performed by an independent third party developer that lacks authorized access to an HCI platform instance.

15 Claims, 2 Drawing Sheets

DOCKER-BASED PLUGINS FOR HYPERCONVERGED INFRASTRUCTURE PLATFORMS

TECHNICAL FIELD

The present disclosure relates to virtualized information handling system platforms and, more particularly, plugin support for implementing customer-specific features within such platforms.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be implemented with a hyperconverged infrastructure (HCI) architecture integrating virtualized compute, storage, and networking resources with management and consolidation capabilities that can scale-out according to application needs. Commercially distributed examples of HCI-based appliances include the VxRail family of HCI appliances from Dell Technologies.

An HCI platform running on an HCI appliance includes native functionality common to all HCI platform instances. An HCI platform may also support platform plugins for implementing extended functionality, i.e., functionality not native to the platform. Traditionally, however, the plugin creation process supported by HCI platforms does not fully embrace widely accepted methodologies for constructing cloud native applications that thrive in a dynamic, virtualized cloud environment.

SUMMARY

Common problems associated with conventionally implemented platform plugins are addressed by disclosed systems and methods, which may include retrieving a base image of a plugin for a hyperconverged infrastructure (HCI) platform, creating a Docker image for an HCI platform plugin based, in part, on the base image, wherein the HCI platform plugin enables an extended function not native to the HCI platform, registering the Docker image within an HCI platform instance running on an HCI appliance associated with a customer, and saving the Docker image to a Docker image repository within the HCI platform instance. The extended HCI platform function may be any suitable function including, as an illustrative example, a function for provisioning a third party storage device within the HCI platform, where the third party storage device refers to a storage device not native to HCI appliances manufactured or distributed by an original equipment manufacturer (OEM). For implementations employing any VxRail brand of HCI appliance, the OEM would be Dell Technologies.

In at least one embodiment, the creation, registration, and saving of the Docker image for the HCI platform plugin are performed by a third party developer that may lack authorized access to any HCI platform instance. In this manner, disclosed methods and systems open up the plugin development process to the independent developer community and encourage development of cloud native plugins.

The Docker image may be run or otherwise invoked to establish a Docker container exposing the extended function to HCI platform users. Responsive to receiving end user input, i.e., input from an authorized user of the HCI platform instance, invoking the extended function, a Docker container corresponding to the extended function may be identified and the user request may be routed to the identified Docker container. In at least some embodiments, creating the Docker image includes invoking a cloud-based signature server to digitally sign the Docker image. The signature server may be implemented as a cloud-based resource maintained by the HCI appliance OEM. Similarly, the base image of the HCI platform plugin may reside in a cloud-based store maintained by the HCI appliance OEM.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
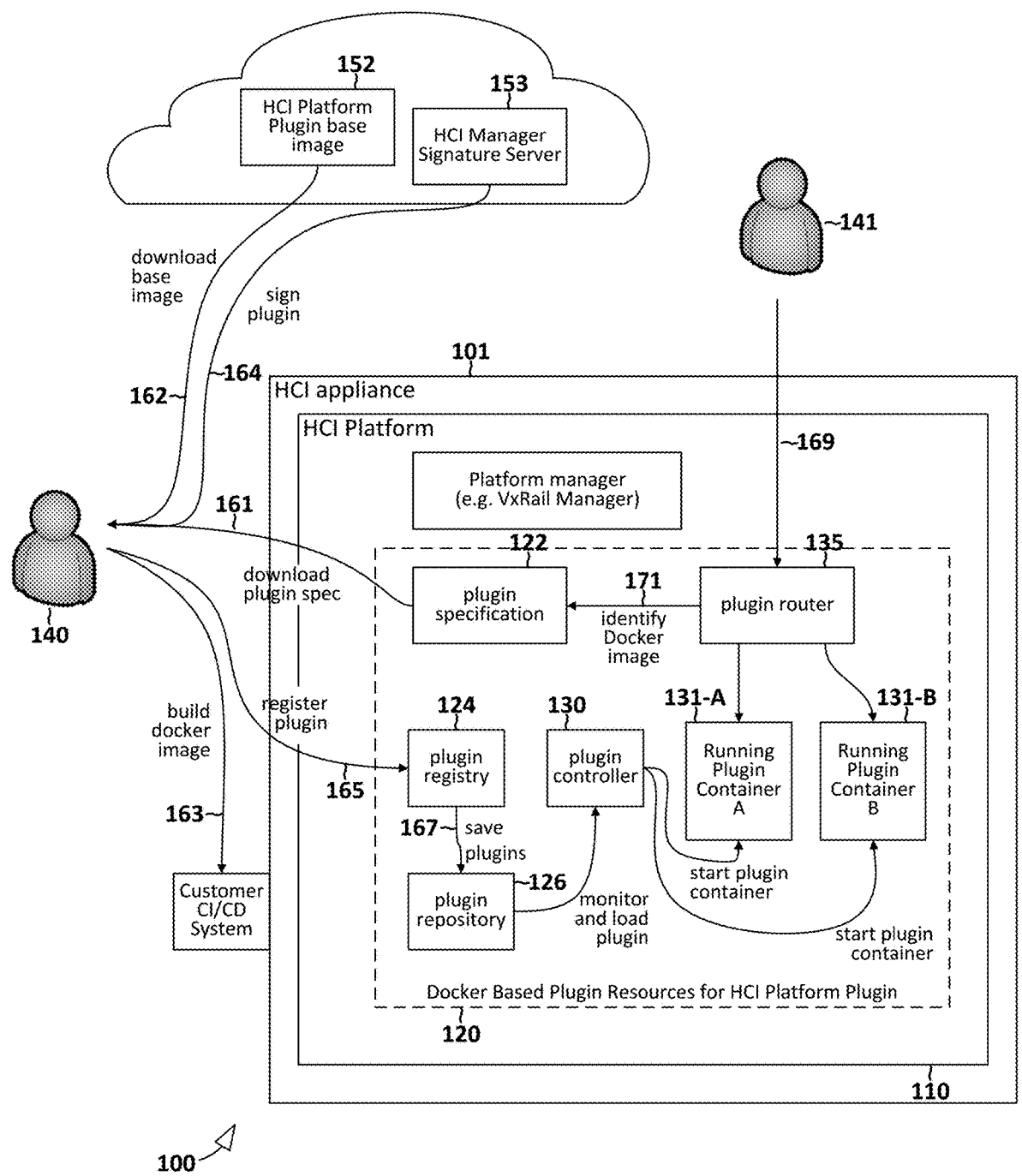
FIG. 1 illustrates an information handling system including an HCI appliance running an HCI platform in accordance with disclosed features enabling development of and support for cloud native plugins.
Figure 2:
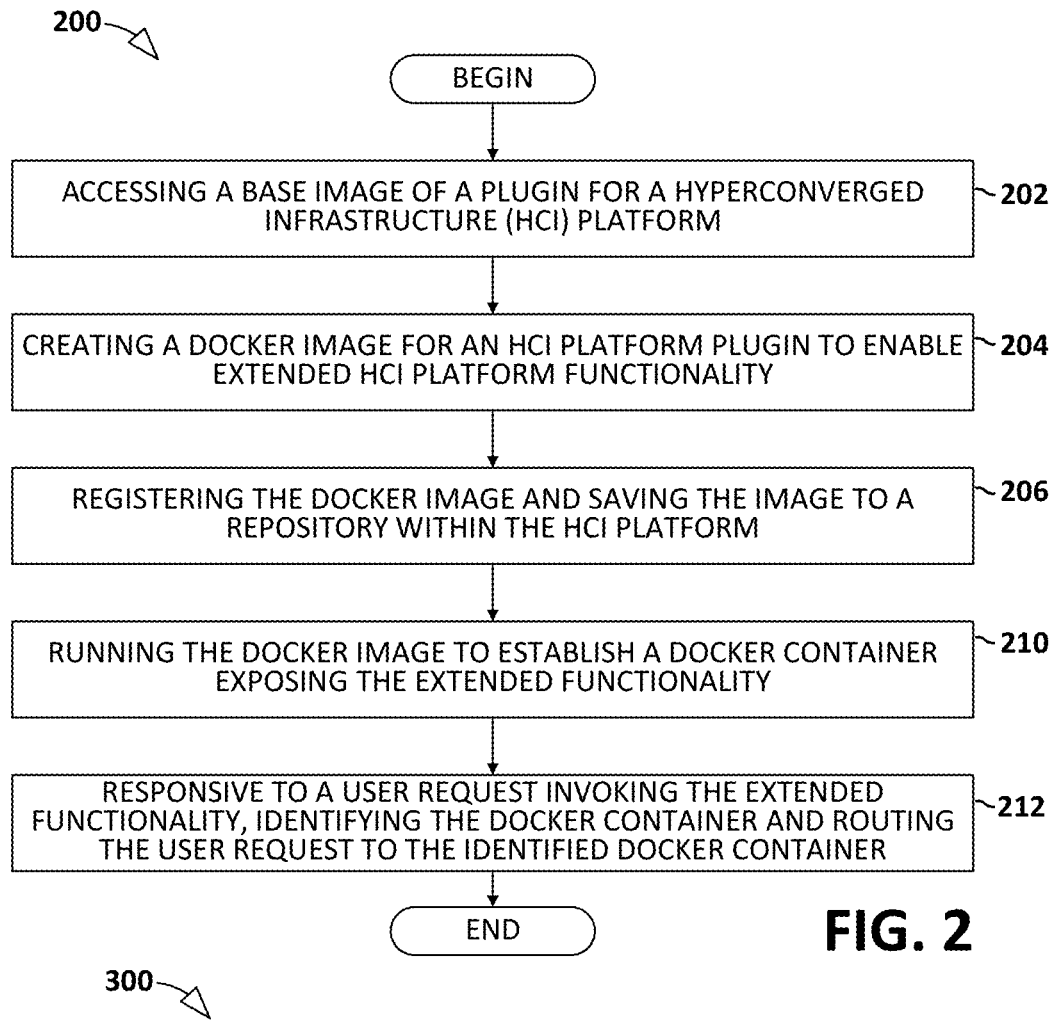
FIG. 2 illustrates a flow diagram of a method for implementing an HCI platform plugin in accordance with disclosed teachings.
Figure 3:
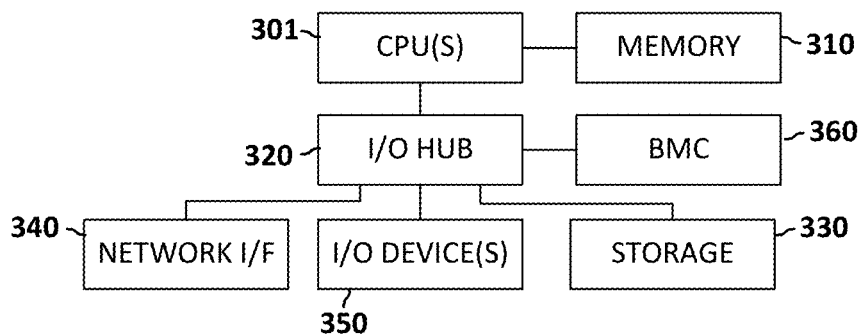
FIG. 3 illustrates an exemplary information handling system suitable for use in conjunction with subject matter disclosed in FIG. 1 and FIG. 2.

Exemplary embodiments and their advantages are best understood by reference to FIGS. 1-3, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates an information handling system 100 comprising an HCI appliance 101 running an HCI platform 110. The illustrated HCI platform 110 includes Docker-based plugin resources 120 for implementing Docker-based platform plugins exemplified in FIG. 1 by the actively-running plugin containers 131, of which two instances (131-A and 131-B) are depicted. In at least one embodiment, HCI appliance 101 comprises any of various suitably-provisioned and suitable-configured HCI appliances including, without limitation, a VxRail HCI appliance from Dell Technologies.

As depicted in FIG. 1, the Docker-based plugin (DBP) resources 120 illustrated in FIG. 1 include a DBP specification 122, a DBP registry 124, a DBP repository 126, a DBP controller 130, a DBP router 135, and a pair of actively-running plugin containers 131-A and 131-B that enable extended functionality for HCI platform 110. For the sake of brevity and clarity, subsequent references to DBP resources 120 may omit the DBP prefix.

FIG. 1 further illustrates actions performed by the depicted elements of FIG. 1 to establish a containerized platform plugin. At least some of the actions depicted in FIG. 1 may be performed or triggered by a $3^{rd}$ party developer represented in FIG. 1 simply as developer user 140.

As depicted in FIG. 1, developer user 140 may begin to implement a Docker-based platform plugin by downloading (operation 161) a plugin specification 122 from HCI platform 110. Plugin specification 122 may include pre-defined interfaces as well as one or more manuals for developing Docker-based plugins. Developer user 140 may then download (operation 162) a base image for a Docker-based platform plugin from a cloud-based store (not explicitly depicted) of the HCI appliance manufacturer or distributor. Based on the downloaded platform plugin base image 152, one or more image layer files (not explicitly depicted in FIG. 1), and a manifest file (not depicted), which may include, as examples, image tags, a digital signature, and details on how to configure the container for different types of host platforms, developer user 140 may build (operation 163) a Docker image for the platform plugin, digitally sign (operation 164) the Docker image using, in the depicted example, a cloud-based signature server 153, and register (operation 165) the Docker image with a plugin registry 124 in HCI platform 110. Registering the Docker image may cause HCI platform 110 to map application program interface (API) universal resource locators (URLs) associated with the Docker image to system identifiable locators. The Docker image for the plugin may then be saved (operation 167) to a plugin repository 126, where the Docker image may be monitored and run by a plugin controller 130 to produce one or more running plugin container 131-A, 131-B, etc.

When a system user 141, i.e., an authorized user of HCI platform 110, provides user input invoking (operation 169) functionality associated with the plugin, the plugin router 135 will identify (operation 171) the applicable Docker image plugin specification and the router will redirect the request to the correct plugin container 131. Identifying the applicable Docker image may include accessing information stored in plugin specification 122, plugin registry 124, and/or plugin repository 126. In this manner, disclosed teachings enable $3^{rd}$ party developers to develop cloud-native functional extensions for HCI appliance 110 using cloud native.

Referring now to FIG. 2, a flow diagram illustrates an exemplary method 200 for implementing Docker-based HCI platform plugins to support functional extensions of platform-native functionality. In at least one embodiment, any one or more of the illustrated operations may be performed by a third party developer that lacks authorized access to any HCI platform instance.

The method 200 depicted in FIG. 2 includes accessing (operation 202) a base image of a plugin for an HCI platform running on an HCI appliance associated with an end user customer of the HCI appliance OEM. A Docker image for an HCI platform plugin is created (operation 204) based, at least in part, on the base image, to enable extended HCI platform functionality. The creation of the Docker image from a base image may include developing one or more image layers and a Docker manifest specific to the extended functionality as will be familiar to those of ordinary skill in the field of cloud native application development. The illustrated method 200 further includes registering (operation 206) the Docker image and saving the image to a repository, e.g., a Docker image repository within the HCI platform instance. The Docker image in the Docker image repository may then be run or otherwise invoked (operation 210) to establish a running Docker container embodying and/or exposing the applicable extended functionality to users of the HCI platform instance. Responsive to an HCI platform user request invoking the extended functionality, the illustrated method identifies (operation 212) the appropriate Docker container, and routes the request to the identified Docker container. Identifying the appropriate Docker container may include accessing information in plugin specification 122 (FIG. 1), plugin registry 124 (FIG. 1), and/or plugin repository 126 (FIG. 1).

Referring now to FIG. 3, any one or more of the elements illustrated in FIG. 1 through FIG. 2 may be implemented as or within an information handling system exemplified by the information handling system 300 illustrated in FIG. 3. The illustrated information handling system includes one or more general purpose processors or central processing units (CPUs) 301 communicatively coupled to a memory resource 310 and to an input/output hub 320 to which various I/O resources and/or components are communicatively coupled. The I/O resources explicitly depicted in FIG. 3 include a network interface 340, commonly referred to as a NIC (network interface card), storage resources 330, and additional I/O devices, components, or resources 350 including as non-limiting examples, keyboards, mice, displays, printers, speakers, microphones, etc. The illustrated information handling system 300 includes a baseboard management controller (BMC) 360 providing, among other features and services, an out-of-band management resource which may be coupled to a management server (not depicted). In at least some embodiments, BMC 360 may manage information handling system 300 even when information handling system 300 is powered off or powered to a standby state. BMC 360 may include a processor, memory, an out-of-band network interface separate from and physically isolated from an in-band network interface of information handling system 300, and/or other embedded information handling resources. In certain embodiments, BMC 360 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:
retrieving a base image of a plugin for a hyperconverged infrastructure (HCI) platform;
creating a Docker image for an HCI platform plugin based, in part, on the base image, wherein the HCI platform plugin enables an extended function not native to the HCI platform;
registering the Docker image within an HCI platform instance running on an HCI appliance associated with a customer;
saving the Docker image to a Docker image repository within the HCI platform instance; and
running the Docker image to establish a Docker container exposing the extended function to HCI platform users.

2. The method of claim 1, further comprising:
responsive to receiving input, from an authorized user of the HCI platform instance, invoking the extended function;
identifying a Docker container corresponding to the extended function; and
routing the user request to the Docker container.

3. The method of claim 1, wherein creating the Docker image includes invoking a cloud-based signature server to digitally sign the Docker image.

4. The method of claim 3, wherein the signature server comprises a cloud-based resource maintained by an original equipment manufacturer (OEM) of the HCI appliance.

5. The method of claim 4, wherein retrieving the base image comprises retrieving the base image from a cloud-based store maintained by the OEM of the HCI appliance.

6. The method of claim 1, wherein said retrieving, creating, registering, and saving are performed by a third party developer that is not an authorized user of the HCI platform instance.

7. The method of claim 1, wherein the extended HCI platform function includes functionality for provisioning a third party storage device within the HCI platform.

8. An information handling system, comprising:
- a central processing unit (CPU);
- a system memory accessible to the CPU, including processor executable instructions that, when executed by the CPU, cause the system to perform operations including:
  - retrieving a base image of a plugin for a hyperconverged infrastructure (HCI) platform;
  - creating a Docker image for an HCI platform plugin based, in part, on the base image, wherein the HCI platform plugin enables an extended function not native to the HCI platform;
  - registering the Docker image within an HCI platform instance running on an HCI appliance associated with a customer;
  - saving the Docker image to a Docker image repository within the HCI platform instance; and
  - running the Docker image to establish a Docker container exposing the extended function to HCI platform users.

9. The information handling system of claim 8, further comprising:
- responsive to receiving input, from an authorized user of the HCI platform instance, invoking the extended function;
- identifying a Docker container corresponding to the extended function; and
- routing the user request to the Docker container.

10. The information handling system of claim 8, wherein creating the Docker image includes invoking a cloud-based signature server to digitally sign the Docker image.

11. The information handling system of claim 10, wherein the signature server comprises a cloud-based resource maintained by an original equipment manufacturer (OEM) of the HCI appliance.

12. The information handling system of claim 11, wherein retrieving the base image comprises retrieving the base image from a cloud-based store maintained by the OEM of the HCI appliance.

13. The information handling system of claim 8, wherein said retrieving, creating, registering, and saving are performed by a third party developer that is not an authorized user of the HCI platform instance.

14. The information handling system of claim 8, wherein the extended HCI platform function includes functionality for provisioning a third party storage device within the HCI platform.

15. A method, comprising:
- retrieving a base image of a plugin for a hyperconverged infrastructure (HCI) platform;
- creating a Docker image for an HCI platform plugin based, in part, on the base image, wherein the HCI platform plugin enables an extended function not native to the HCI platform;
- registering the Docker image within an HCI platform instance running on an HCI appliance associated with a customer; and
- saving the Docker image to a Docker image repository within the HCI platform instance;
- wherein creating the Docker image includes invoking a cloud-based signature server, maintained by an original equipment manufacturer (OEM) of the HCI appliance, to digitally sign the Docker image.

* * * * *